United States Patent
Zawilinski et al.

(10) Patent No.: US 12,313,011 B2
(45) Date of Patent: May 27, 2025

(54) SELF-ACTUATED BLEED VALVES FOR GAS TURBINE ENGINES

(71) Applicant: Hamilton Sundstrand Corporation, Charlotte, NC (US)

(72) Inventors: David J. Zawilinski, W. Granby, CT (US); Robert B. Goodman, West Hartford, CT (US); Scott W. Simpson, Feeding Hills, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 141 days.

(21) Appl. No.: 18/239,436

(22) Filed: Aug. 29, 2023

(65) Prior Publication Data

US 2025/0075663 A1    Mar. 6, 2025

(51) Int. Cl.
| | |
|---|---|
| F02C 9/18 | (2006.01) |
| F01D 17/10 | (2006.01) |
| F01D 19/00 | (2006.01) |
| F02C 7/26 | (2006.01) |
| F16K 1/22 | (2006.01) |
| F16K 1/228 | (2006.01) |

(52) U.S. Cl.
CPC .............. *F02C 9/18* (2013.01); *F01D 17/105* (2013.01); *F01D 19/00* (2013.01); *F02C 7/26* (2013.01); *F16K 1/22* (2013.01); *F16K 1/2285* (2013.01); *F05D 2220/32* (2013.01); *F05D 2260/606* (2013.01); *F05D 2260/85* (2013.01)

(58) Field of Classification Search
CPC ........ F01D 17/105; F01D 17/148; F02C 9/18; F04D 27/0215; F05D 2260/606; F16K 1/22; F16K 1/221; F16K 1/2285; F16K 27/0218; F16K 39/028

See application file for complete search history.

(56) References Cited

U.S. PATENT DOCUMENTS

| | | | | |
|---|---|---|---|---|
| 3,545,486 | A | * | 12/1970 | Larson ................... F16K 1/221 137/554 |
| 4,506,594 | A | | 3/1985 | Rowland et al. |
| 4,671,318 | A | | 6/1987 | Benson |
| 6,273,136 | B1 | * | 8/2001 | Steinert .................. B64D 13/02 137/601.15 |
| 8,814,498 | B2 | | 8/2014 | Goodman et al. |
| 9,964,223 | B2 | | 5/2018 | Coretto et al. |
| 10,641,183 | B2 | | 5/2020 | Joudareff et al. |
| 2010/0006165 | A1 | | 1/2010 | Banta et al. |
| 2018/0291761 | A1 | | 10/2018 | Peleg |

OTHER PUBLICATIONS

Extended European Search Report for EP Application No. 24185505.5, Dated Dec. 10, 2024, pp. 8.

* cited by examiner

*Primary Examiner* — Scott J Walthour
(74) *Attorney, Agent, or Firm* — Kinney & Lange, P.A.

(57) ABSTRACT

A bleed valve includes a housing. The housing includes an inlet and an outlet with a cylindrical flow path defined between the inlet and the outlet. A diametral plane is defined diametrically spanning the cylindrical flow path. A butterfly disc inside the housing is rotatably mounted to the housing along a rotation axis for rotation between an open position and a closed position. A link rotatably is connected to a pivot point on the butterfly disc for relative rotation of the link and the butterfly disc along a pivot axis parallel to the rotation axis. The pivot axis is on an opposite side of the diametral plane from the rotation axis.

20 Claims, 2 Drawing Sheets

SELF-ACTUATED BLEED VALVES FOR GAS TURBINE ENGINES

STATEMENT OF GOVERNMENT RIGHTS

This invention was made with government support under contract nos. BOA N00019-21-G0005 & DO N00019-23-F-0019 awarded by the Joint Program Office (JPO). The government has certain rights in the invention.

BACKGROUND

1. Field

The present disclosure relates to gas turbine engines, and more particularly to bleed valves for assisting startup of gas turbine engines.

2. Description of Related Art

During engine start for gas turbine engines, the loading on the compressor may cause a compressor surge. If not mitigated, compressor surges could damage to the compressor and engine. To avoid this, the engine bleeds air from the compressor during start, reducing the load on the compressor. Traditionally, a poppet valve us used for relieving the bleed air from the compressor during startup. However, poppet vales have a limited flow area for a given valve size. This can create envelope challenges for engine designers needing to compromise between number or size of poppet valves on one hand, and the need to reduce size and weight of engine components. Exacerbating this challenge is the trend of rising compressor ratios in newer engine designs.

The conventional techniques have been considered satisfactory for their intended purpose. However, there is an ever present need for improved systems and methods for bleed valves for gas turbine engines. This disclosure provides a solution for this need.

SUMMARY

A bleed valve includes a housing. The housing includes an inlet and an outlet with a cylindrical flow path defined between the inlet and the outlet. A diametral plane is defined diametrically spanning the cylindrical flow path. A butterfly disc inside the housing is rotatably mounted to the housing along a rotation axis for rotation between an open position of the butterfly disc allowing flow through the cylindrical flow path and a closed position of the butterfly disc blocking flow through the cylindrical flow path. The rotation axis is on a first side of the diametral plane with the butterfly disc in both the open position and the closed position. A link is rotatably connected to a pivot point on the butterfly disc for relative rotation of the link and the butterfly disc along a pivot axis parallel to the rotation axis. The pivot axis is on a second side of the diametral plane opposite the first side in both the open position and the closed position. A biasing member is engaged between the housing and the link to bias the butterfly disc toward the open position.

A piston can be slidingly engaged in a piston portion of the housing. The piston can be engaged to the biasing member for linear movement along an axis of the housing. The piston can be engaged to the link for biasing of the butterfly disc. A pin can connect the link to the piston. The link and the piston can be rotatable relative to one another about a pin axis defined by the pin. The pin axis can be parallel to the rotation axis and to the pivot axis. The pin axis can be in the diametral plane for the full stroke of the piston defined for movement of the piston from the open position to the closed positions of the butterfly disc. The pivot axis and the rotation axis can be on opposite sides of the butterfly disc throughout a full kinematic range of motion of the butterfly disc between the open and closed positions.

The outlet can include a plurality of lateral facing windows through the housing relative to a longitudinal axis of the housing. The inlet can include an axial end opening into the cylindrical flow path. The axial end opening can be parallel to the butterfly disc with the butterfly disc in the closed position. A flexible seal can extend circumferentially around a perimeter of the valve disc to seal between the valve disc and the housing with the valve disc in the closed position.

The butterfly disc, the link, the biasing member, and the housing can be configured to move the butterfly disc starting from the open position to the open position at $11\pm2$ psi ($0.75\pm0.14$ atm) as pressure differential rises between the inlet and the outlet to the closed position at $12\pm2$ psi ($0.82\pm0.14$ atm). The butterfly disc, the link, the biasing member, and the housing can be configured to move the butterfly disc starting from the open position to the open position at $9\pm2$ psi ($0.61\pm0.14$ atm) as pressure differential rises between the inlet and the outlet to the closed position at $14\pm2$ psi ($0.95\pm0.14$ atm). In the open position the butterfly disc can rest at an 80° angle relative to the closed position of the butterfly disc.

A gas turbine engine includes a compressor section upstream of a combustor that is upstream of a turbine section. The compressor section, the combustor, and the turbine section define a gas path therethrough. A bleed valve as described above is included, wherein the housing of the bleed valve is mounted to a compressor case of the compressor section, with the inlet of the bleed valve in fluid communication with the gas path in the compressor section, and the outlet of the bleed valve in fluid communication with a bleed exhaust.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
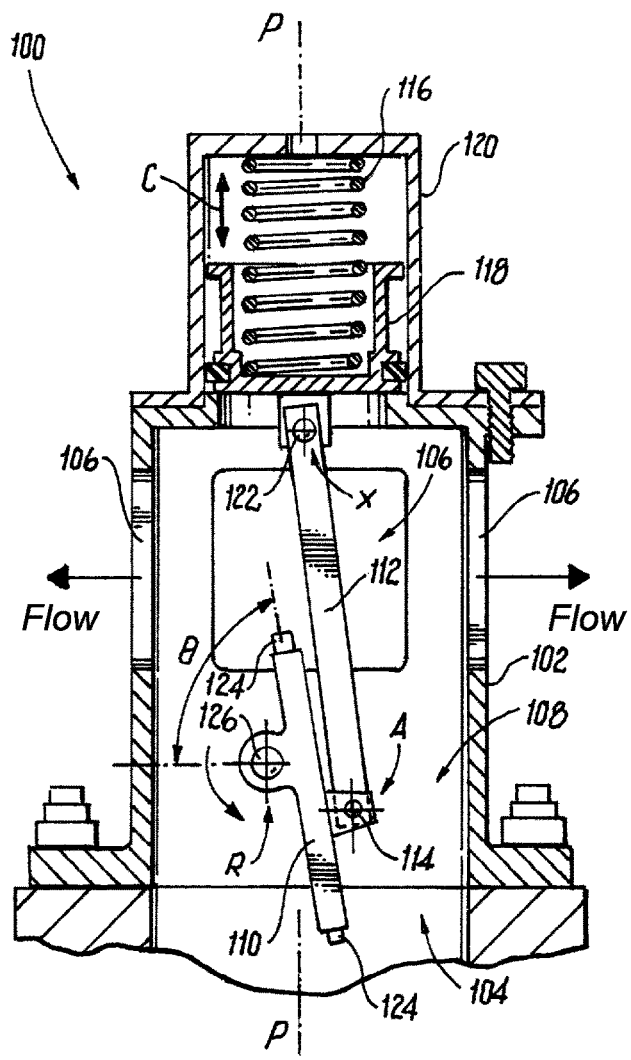
FIG. 1 is a schematic partially cross-sectioned side elevation view of an embodiment of a bleed valve constructed in accordance with the present disclosure, showing the butterfly disc in the open position.

Reference will now be made to the drawings wherein like reference numerals identify similar structural features or aspects of the subject disclosure. For purposes of explanation and illustration, and not limitation, a partial view of an embodiment of a bleed valve in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide bleed valves with improved size and weight for their given flow area, relative to poppet bleed valves.

Figure 4:
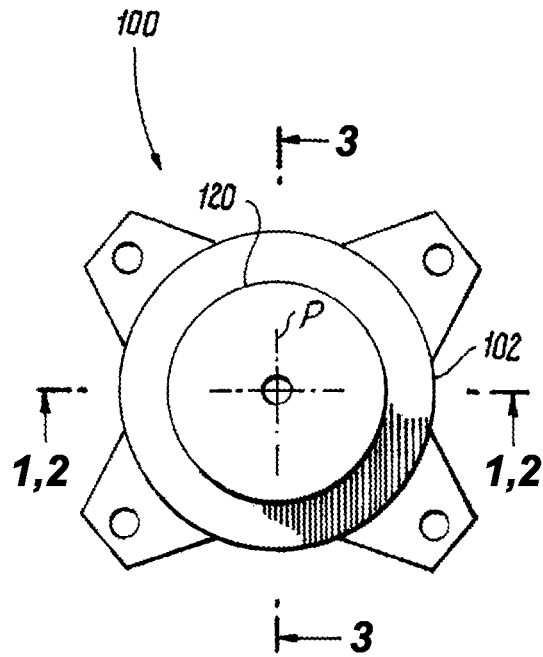
FIG. 4 is a plan view of the bleed valve of FIG. 1, showing the sectional lines for the cross-sections of FIGS. 1-3.

The bleed valve 100 includes a housing 102. The housing 102 includes an inlet 104 and an outlet 106 with a cylindrical flow path 108 defined between the inlet 104 and the outlet 106. A diametral plane P is defined diametrically spanning the cylindrical flow path 108. The outlet 106 of the housing 102 includes a plurality of lateral facing windows through the housing 102 relative to a longitudinal axis C of the housing 102 in the diametral plane P. The inlet 104 includes an axial end opening into the cylindrical flow path 108, e.g. on the bottom of the housing as oriented in FIGS. 1-3. FIG. 4 shows the cross-section directions for FIGS. 1-3.

Figure 2:
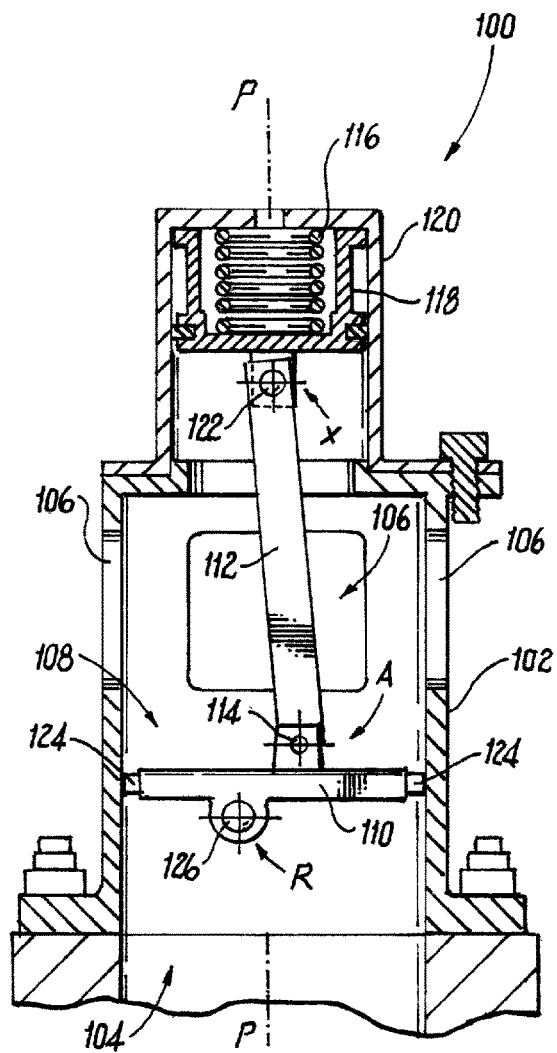
FIG. 2 is a schematic partially cross-sectioned side elevation view of the bleed valve of FIG. 1, showing the butterfly disc in the closed position.
Figure 3:
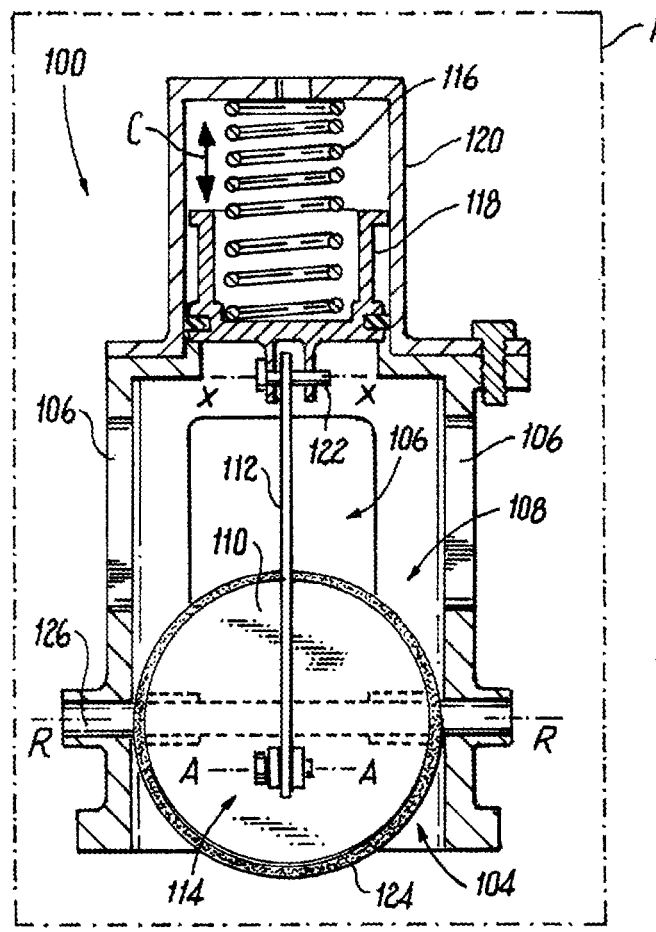
FIG. 3 is a schematic, partially cross-sectioned side elevation view of the bleed valve of FIG. 2, showing the circumference of the butterfly disc.

A butterfly disc 110 inside the housing 102 is rotatably mounted to the housing 102 along a rotation axis R for rotation between an open position of the butterfly disc 110, shown in FIG. 1, allowing flow through the cylindrical flow path 108, and a closed position of the butterfly disc 110, shown in FIG. 2, blocking flow through the cylindrical flow path 108. The rotation axis R is on a first side of the diametral plane P, i.e. on the left side of the diametral plane P as oriented in FIG. 1, with the butterfly disc 110 in both the open position of FIGS. 1 and 2 and the closed position of FIG. 3. The rotation axis R is perpendicular to the diametral plane P. A link 112 is rotatably connected to a pivot point 114 on the butterfly disc 110 for relative rotation of the link 112 and the butterfly disc 110 along a pivot axis A that is parallel to the rotation axis R. The pivot axis A is on a second side of the diametral plane P (the right side as oriented in FIG. 1) opposite the first side in both the open position of FIG. 1 and in the closed position of FIG. 2. The axial end opening 104 and the butterfly disc 110 are parallel to one another in the closed position shown in FIG. 2. A flexible seal 124 extends circumferentially around the perimeter of the valve disc 110 to seal between the valve disc 110 and the housing 102 with the valve disc 110 in the closed position shown in FIG. 2.

A biasing member 116 is engaged between the housing 102 and the link 112 to bias the butterfly disc 110 toward the open position shown in FIG. 1. The biasing member 116 can be a spring, stack of Belleville washers, block of resilient material, pneumatic pocket, or any other suitable type of biasing member capable of developing a compressive spring force and providing reasonable stroke. A piston 118 is slidingly engaged in a piston portion 120 of the housing 102. The piston 118 is engaged to the biasing member 116 for linear movement along an axis C of the housing 102, wherein axis C lies in the diametral plane P. The piston 118 contains the biasing member 116 as the piston 118 stokes up and down as oriented in FIGS. 1 and 2 between the open position of the butterfly disc 110 of FIG. 1, and the closed position shown in FIG. 2. The piston 118 is also engaged to the link 112 for biasing of the butterfly disc 110. A pin 122 connects the link 112 to the piston 118. The link 112 and the piston 118 are rotatable relative to one another about a pin axis X defined by the pin 122. The pin axis X is parallel to the rotation axis R and to the pivot axis A. The pin axis X is in the diametral plane P for the full stroke of the piston 118. The pivot axis A and the rotation axis R are on opposite sides of the butterfly disc 110 throughout the full kinematic range of motion of the butterfly disc 110 between the open and closed positions of FIGS. 1 and 2, respectively.

The butterfly disc 110, the link 112, the biasing member 116, and the housing 102 are configured to move the butterfly disc 110 starting from the open position of FIG. 1 for example at a pressure differential of 11±2 psi (0.75±0.14 atm) as pressure differential rises between the inlet 104 and the outlet 106, e.g. as during engine startup, then to the closed position as shown in FIG. 2 at a pressure differential for example of 12±2 psi (0.82±0.14 atm) as pressure continues to rise during startup. The pressure differentials shown may in actuality vary depending upon the specific engine requirements. The butterfly disc, the link, the biasing member, and the housing can be configured to move the butterfly disc starting from the open position to the open position at 9±2 psi (0.61±0.14 atm) as pressure differential rises between the inlet and the outlet to the closed position at 14±2 psi (0.95±0.14 atm). In the open position of FIG. 1, the butterfly disc rests at an 80° angle θ relative to a the closed position of the butterfly disc, i.e. 80° from a plane through the flow path 108 normal to the longitudinal axis C through the flow path 108.

Figure 5:
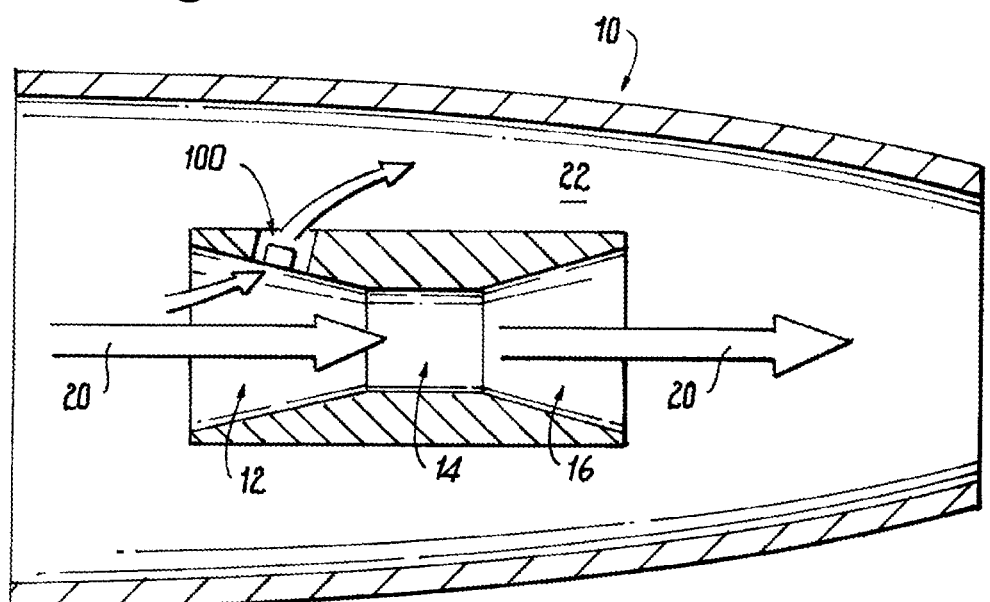
FIG. 5 is a schematic view of a gas turbine engine, showing the bleed valve of FIG. 1 mounted to the compressor case.

With reference now to FIG. 5, a gas turbine engine 10 includes a compressor section 12 upstream of a combustor 14 that is upstream of a turbine section 16. The compressor section 12, the combustor 14, and the turbine section 16 define a gas path 20 therethrough, indicated by the large flow arrows in FIG. 5. A bleed valve 100 as described above is included. The housing 102 (labeled in FIGS. 1-4) of the bleed valve 100 is mounted to a compressor case 18 of the compressor section 12, with the inlet 104 (labeled in FIGS. 1-3) of the bleed valve 100 in fluid communication with the gas path 20 in the compressor section 12. The outlet 106 (labeled in FIGS. 1-3) of the bleed valve 100 in fluid communication with a bleed exhaust 22 e.g. in a bypass duct, nacelle, or the like.

A butterfly disc in a traditional valve has a supporting shaft in the middle of the disc and flow path cylinder. It is well known that in that traditional configuration, maximum closing aerodynamic torque occurs around the 70° angle and drops to zero as the valve moves toward 90° fully open position. In contrast, in the present disclosure the valve angle is set at around 80° for fully open to exert an aerodynamic closing torque as indicated by the flow and torque arrows in FIG. 1. To increase the closing torque the butterfly rotation shaft 126 (on the rotation axis R, labeled in FIG. 1) is offset from the center of the disc 110 and from the center of the cylinder of the flow path 108. As the disc 110 closes, the closing aerodynamic moment increases more than the force from the biasing member 116, creating a snap action effect. This results in a small change in bleed pressure to move the valve from open to closed.

As shown in FIG. 1, the butterfly disc is biased to the open position via a piston spring load. The load is applied through the link 112 which exerts an opening moment on the disc 110 opposing the aero dynamic closing torque on the butterfly. The disc 110 need only minimally intrudes into the engine case, if at all. During engine start when the bleed pressure is low the spring or other biasing member 116 is designed to keep the valve open at a prescribed pressure gradient across the disc 110. When this value is exceeded slightly, the aerodynamic moment across the disc exerts a force through the link 112 opposing the spring force and the valve 100 begins to close. As it closes, the moment increases because of the disc pivot offset and the valve 100 snaps closed.

FIG. 1 shows the disc supported by the shaft 126 which is guided at each end by the housing 102. FIG. 2 shows the valve 100 in the closed position with the disc 110 exerting a high closing moment force through the link 112 opposing the relatively light spring load. The seal ring 124 on the disc 110 reduces or minimizes the leakage bleed flow into the engine nacelle or other bleed exhaust.

Systems and methods as disclosed herein provide potential benefits including the following. The butterfly disc can be driven to the open position via the piston spring load. The load is applied through a link which exerts an opening moment on the disc opposing the aero dynamic closing torque on the butterfly. When the prescribed pressure differential across the disc is exceeded the aerodynamic moment across the disc exerts a force opposing the spring force and the valve closes. The moment is increased because of the disc pivot offset. Given limited space on the engine compressor case to install a bleed valve, it is important to reduce or minimize the valve size while maintaining or even increasing the flow area through the valve for bleed air. The butterfly disc as disclosed herein provides a larger bleed flow through area for a given valve size relative to that of the more traditional poppet bleed valves.

The methods and systems of the present disclosure, as described above and shown in the drawings, provide for bleed valves with improved size and weight for their given flow area, relative to poppet bleed valves. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bleed valve comprising:
   a housing including an inlet and an outlet with a cylindrical flow path defined between the inlet and the outlet, wherein a diametral plane is defined diametrically spanning the cylindrical flow path;
   a butterfly disc inside the housing, rotatably mounted to the housing along a rotation axis for rotation between an open position of the butterfly disc allowing flow through the cylindrical flow path and a closed position of the butterfly disc blocking flow through the cylindrical flow path, wherein the rotation axis is on a first side of the diametral plane with the butterfly disc in both the open position and the closed position;
   a link rotatably connected to a pivot point on the butterfly disc for relative rotation of the link and the butterfly disc along a pivot axis parallel to the rotation axis, wherein the pivot axis is on a second side of the diametral plane opposite the first side in both the open position and the closed position; and
   a biasing member engaged between the housing and the link to bias the butterfly disc toward the open position.

2. The bleed valve as recited in claim 1, further comprising a piston slidingly engaged in a piston portion of the housing, wherein the piston is engaged to the biasing member for linear movement along an axis of the housing, and wherein the piston is engaged to the link for biasing of the butterfly disc.

3. The bleed valve as recited in claim 2, wherein a pin connects the link to the piston, wherein the link and the piston are rotatable relative to one another about a pin axis defined by the pin, wherein the pin axis is parallel to the rotation axis and to the pivot axis.

4. The bleed valve as recited in claim 3, wherein the pin axis is in the diametral plane for a stroke of the piston defined for the open and closed positions of the butterfly disc.

5. The bleed valve as recited in claim 1, wherein the outlet includes a plurality of lateral facing windows through the housing relative to a longitudinal axis of the housing.

6. The bleed valve as recited in claim 1, wherein the inlet includes an axial end opening into the cylindrical flow path, wherein the axial end opening is parallel to the butterfly disc with the butterfly disc in the closed position.

7. The bleed valve as recited in claim 1, further comprising a flexible seal extending circumferentially around a perimeter of the butterfly disc to seal between the butterfly disc and the housing with the butterfly disc in the closed position.

8. The bleed valve as recited in claim 1, wherein the butterfly disc, the link, the biasing member, and the housing are configured to move the butterfly disc starting from the open position at 9±2 psi (0.61±0.14 atm) as a pressure differential rises between the inlet and the outlet.

9. The bleed valve as recited in claim 1, wherein the butterfly disc, the link, the biasing member, and the housing are configured to move the butterfly disc to the closed position at 14±2 psi (0.95±0.14 atm) as a pressure differential rises between the inlet and the outlet.

10. The bleed valve as recited in claim 1, wherein in the open position the butterfly disc rests at an 80° angle relative to the closed position of the butterfly disc.

11. The bleed valve as recited in claim 1, wherein the pivot axis and the rotation axis are on opposite sides of the butterfly disc throughout a full kinematic range of motion of the butterfly disc between the open and closed positions.

12. A gas turbine engine comprising:
    a compressor section upstream of a combustor that is upstream of a turbine section, wherein the compressor section, the combustor, and the turbine section define a gas path therethrough; and
    a bleed valve including:
       a housing mounted to a compressor case of the compressor section and including an inlet in fluid communication with the gas path in the compressor section and an outlet in fluid communication with a bleed exhaust, with a cylindrical flow path defined between the inlet and the outlet, wherein a diametral plane is defined by the cylindrical flow path;
       a butterfly disc inside the housing, rotatably mounted to the housing along a rotation axis between an open position of the butterfly disc allowing flow through the cylindrical flow path and a closed position of the butterfly disc blocking flow through the cylindrical flow path, wherein the rotation axis is on a first side of the diametral plane with the butterfly disc in both the open position and the closed position;
       a link rotatably connected to a pivot point on the butterfly disc for relative rotation of the link and the butterfly disc along a pivot axis parallel to the rotation axis, wherein the pivot axis is on a second side of the diametral plane opposite the first side in both the open position and the closed position; and a biasing member engaged between the housing and the link to bias the butterfly disc toward the open position.

13. The gas turbine engine as recited in claim 12, further comprising a piston slidingly engaged in a piston portion of the housing, wherein the piston is engaged to the biasing member for linear movement along an axis of the housing, and wherein the piston is engaged to the link for biasing of the butterfly disc.

14. The gas turbine engine as recited in claim 13, wherein a pin connects the link to the piston, wherein the link and the piston are rotatable relative to one another about a pin axis defined by the pin, wherein the pin axis is parallel to the rotation axis and to the pivot axis.

15. The gas turbine engine as recited in claim 14, wherein the pin axis is in the diametral plane for a stroke of the piston defined for the open and closed positions of the butterfly disc.

16. The gas turbine engine as recited in claim 12, wherein the outlet includes a plurality of lateral facing windows through the housing relative to a longitudinal axis of the housing.

17. The gas turbine engine as recited in claim 12, wherein the inlet includes an axial end opening into the cylindrical flow path, wherein the axial end opening is parallel to the butterfly disc with the butterfly disc in the closed position.

18. The gas turbine engine as recited in claim 12, further comprising a flexible seal extending circumferentially around a perimeter of the butterfly disc to seal between the butterfly disc and the housing with the butterfly disc in the closed position.

19. The gas turbine engine as recited in claim 12, wherein the butterfly disc, the link, the biasing member, and the housing are configured to move the butterfly disc starting from the open position at 11±2 psi (0.75±0.14 atm) as a pressure differential rises between the inlet and the outlet, to the closed position at 12±2 psi (0.82±0.14 atm) as a pressure differential continues to rise between the inlet and the outlet.

20. The gas turbine engine as recited in claim 12, wherein in the open position the butterfly disc rests at an 80° angle relative to a longitudinal axis through the flow path, and wherein the pivot axis and the rotation axis are on opposite sides of the butterfly disc throughout a full kinematic range of motion of the butterfly disc between the open and closed positions.

* * * * *